United States Patent
Malik

(10) Patent No.: US 10,481,244 B2
(45) Date of Patent: Nov. 19, 2019

(54) METHOD FOR CLASSIFYING AN OBJECT IN AN AREA SURROUNDING A MOTOR VEHICLE, DRIVER ASSISTANCE SYSTEM AND MOTOR VEHICLE

(71) Applicant: VALEO Schalter und Sensoren GmbH, Bietigheim-Bissingen (DE)

(72) Inventor: Waqas Malik, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 418 days.

(21) Appl. No.: 15/329,773

(22) PCT Filed: Jul. 27, 2015

(86) PCT No.: PCT/EP2015/067105
§ 371 (c)(1),
(2) Date: May 22, 2017

(87) PCT Pub. No.: WO2016/016161
PCT Pub. Date: Feb. 4, 2016

(65) Prior Publication Data
US 2017/0254882 A1    Sep. 7, 2017

(30) Foreign Application Priority Data
Jul. 29, 2014   (DE) ........................ 10 2014 110 667

(51) Int. Cl.
G01S 7/41       (2006.01)
G01S 13/72      (2006.01)
G01S 13/93      (2006.01)

(52) U.S. Cl.
CPC ............. *G01S 7/412* (2013.01); *G01S 7/415* (2013.01); *G01S 13/726* (2013.01); *G01S 13/931* (2013.01); *G01S 2013/9375* (2013.01)

(58) Field of Classification Search
CPC ........ G01S 7/412; G01S 13/931; G01S 7/415; G01S 13/726; G01S 2013/9375; G01S 13/343
(Continued)

(56) References Cited

U.S. PATENT DOCUMENTS 7,652,617 B2 * 1/2010 Kurtz ...................... G01S 7/352
                                                        342/104
8,314,732 B2   11/2012 Oswald et al.
(Continued)

FOREIGN PATENT DOCUMENTS

DE         103 44 299 A1     4/2005
DE    10 2011 121560 A1      6/2013
(Continued)

OTHER PUBLICATIONS

English translation of description of DE102011121560, Jun. 20, 2013 (Year: 2013).*

(Continued)

*Primary Examiner* — Frank J McGue
(74) *Attorney, Agent, or Firm* — Osha Liang LLP

(57) ABSTRACT

The invention relates to a method for classifying an object (18) in a surrounding area (4) of a motor vehicle (1), having the steps of:
a) transmission of radar signals (5) into the surrounding area (4) by at least one motor vehicle radar sensor (3) and reception of radar signals (6) reflected from the object (18),
b) provision of the information obtained from the radar signals (5, 6) as radar data,
c) production of a power spectrum (11) on the basis of at least one distance value (13) and/or speed value (14) and/or intensity value (12) that the radar data contain as information, (Continued)

d) comparison of at least one spectrum range (15) that the power spectrum (11) contains with an intensity threshold value and selection of the spectrum range (15) as a potential object (16) if the intensity (12) thereof is greater than the intensity threshold value, e) performance of a further cycle with steps a) to d), f) identification of the potential object (16) as an actual object (18) on the basis of whether the potential object (16) has been selected both in a first cycle according to steps a) to d) and at least in the second cycle according to step e), g) comparison of at least one feature ($V_{abs}$, $A_{abs}$, $\sigma^2 V$, $\sigma^2 A$, y, RC) of the identified object (18) with reference features ($V_{abs}$, $A_{abs}$, $\sigma^2 V$, $\sigma^2 A$, y, RC) of a reference object, h) assignment of the object (18) to a particular class (23, 24, 25) from multiple different classes (23, 24, 25) on the basis of the comparison according to step g).

14 Claims, 6 Drawing Sheets

(58) Field of Classification Search
USPC .......................................................... 342/70
See application file for complete search history.

(56) References Cited

U.S. PATENT DOCUMENTS

2008/0106460 A1\* 5/2008 Kurtz .................... G01S 7/352
342/99
2012/0119894 A1 5/2012 Pandy

FOREIGN PATENT DOCUMENTS

JP 2011-186584 A 9/2011
JP 2012-058018 A 3/2012

OTHER PUBLICATIONS

International Search Report issued in PCT/EP2015/067105, dated Oct. 7, 2015 (2 pages).
Written Opinion of the International Searching Authority issued in PCT/EP2015/067105, dated Oct. 7, 2015 (6 pages).
First Office Action in corresponding Chinese Application No. 201580051499.1, dated Jul. 1, 2019 (18 pages).
Notice of Preliminary Rejection in corresponding Korean Application No. 2017-7005445, dated Aug. 21, 2018 (16 pages).

\* cited by examiner

METHOD FOR CLASSIFYING AN OBJECT IN AN AREA SURROUNDING A MOTOR VEHICLE, DRIVER ASSISTANCE SYSTEM AND MOTOR VEHICLE

The invention relates to a method for classifying an object in a surrounding area of a motor vehicle. The invention relates moreover to a driver assistance system for a motor vehicle, and to a motor vehicle having a driver assistance system.

Methods for classifying an object in a surrounding area of a motor vehicle are known from the prior art. As such, US 2012/0119894 A1 involves the surrounding area being captured by means of a radar sensor and a camera at the same time. In order to classify objects in the surrounding area, images from the camera are compared with reference images and data from the radar sensor are compared with reference data.

U.S. Pat. No. 8,314,732 B2 also involves a radar sensor and a video camera being used. The radar data from the radar sensor are used to subject the surrounding area to preprocessing in which areas with target objects are extracted. The areas with the target objects are subsequently processed further using image processing methods and the images from the camera.

In the present case, the interest is in a radar sensor that can perform classification independently of other sensors. As such, U.S. Pat. No. 7,652,617 B2, for example, involves an FMCW (Frequency Modulation Continuous Wave) radar sensor being used that is capable of tracking and classifying objects. The radar sensor computes a Fourier transformation from the received radar signal in a range and Doppler direction, as a result of which a two-dimensional Fourier transformation is obtained. This can be used to compute a two-dimensional power spectrum. These power spectra are computed for different distances from the object and are subsequently used to classify the objects.

It is an object of the invention to provide a method, a driver assistance system and a motor vehicle with which or for which the type of object in the surrounding area of the motor vehicle can be identified more precisely.

This object is achieved according to the invention by a method, by a driver assistance system and by a motor vehicle having the features according to the respective independent patent claims.

In the case of a method according to the invention, an object in the surrounding area of a motor vehicle is classified using the following steps:
a) transmission of radar signals into the surrounding area by at least one motor vehicle radar sensor and reception of radar signals reflected from the object,
b) provision of the information obtained from the radar signals as radar data,
c) production of a power spectrum on the basis of at least one distance value and/or speed value and/or intensity value that the radar data contain as information,
d) comparison of at least one spectrum range that the power spectrum contains with an intensity threshold value and selection of the spectrum range as a potential object if the intensity thereof is greater than the intensity threshold value,
e) performance of a further cycle with steps a) to d),
f) identification of the potential object as an actual object on the basis of whether the potential object has been selected both in a first cycle according to steps a) to d) and at least in the second cycle according to step e),
g) comparison of at least one of the identified object with reference features of a reference object,
h) assignment of the object to a particular class from multiple different classes on the basis of the comparison according to step g).

The method according to the invention allows the object to be classified, or assigned to a particular class, particularly precisely on the basis of the radar data. The assignment to a particular class is dependent on the comparison of the feature of the object with the reference feature of the reference object.

Preferably, in the first cycle, after selection of the potential object, determination of at least one parameter value characterizing the spectrum range is performed and also in the second cycle, after selection of the potential object, determination of the at least one parameter value characterizing the spectrum range is performed and the identification of the potential object as an actual object according to step f) is effected on the basis of whether the parameter values have occurred in both cycles at least within a deviation interval, which is particularly almost zero, defining a value range of the parameter values. It is advantageous that this allows the potential object to be identified as an actual object particularly precisely. This can also reduce noise in the measurements. The aim may be, by way of example, to track the object, particularly the moving object, over multiple cycles on the basis of the at least one parameter value. By way of example, it is assumed that the actual object can be detected or identified in at least two cycles or even more. The potential object thus accordingly becomes an actual object or the object, if misdetection by the tracking can be ruled out.

In one embodiment, the parameter value taken into consideration is a distance value from the radar sensor to the object and/or a relative speed between the radar sensor and the object and/or an angle of azimuth from the radar sensor to the object. The distance value is also referred to as a range value and indicates the distance between the radar sensor and the object. The distance value can be ascertained by means of a propagation time measurement for the radar signal. The relative speed indicates a radial speed of the object with respect to the radar sensor. The relative speed can be ascertained on the basis of a Doppler shift, or a frequency shift in the radar signal.

The angle of azimuth denotes a horizontal angle in the plane of a road for the motor vehicle or a carriageway for the motor vehicle. A reference point for the angle of azimuth may be a longitudinal axis of the motor vehicle, for example. As such, the angle of azimuth can be determined such that it encloses the area between the longitudinal axis of the motor vehicle and an imaginary line from the radar sensor to the object. The angle of azimuth can be determined using two different reception channels, for example. From these, a phase difference is computed, as a result of which a look-up table that contains reference angles of azimuth can be used to determine or estimate the angle of azimuth of the object.

In particular, the at least one feature taken into consideration is an absolute speed of the object and/or an absolute acceleration of the object and/or a variance in the speed of the object and/or a variance in the acceleration of the object and/or an intensity of the object cumulated over the cycles and/or an intensity range of the object from the power spectrum. The feature is thus provided to compare the object with a reference object. The more pronounced a feature in a particular class, the more reliably the object can be assigned to the predetermined class on the basis of this feature. The absolute speed of the object is thus that speed that the object experiences in an earth-fixed coordinate system. The absolute speed of the object is thus independent of the speed of the motor vehicle. The same applies to the absolute acceleration of the object. The absolute acceleration of the object is likewise provided in an earth-fixed coordinate system and is independent of the speed of the motor vehicle. The variance in the speed or the variance in the absolute speed can be ascertained according to step f), which provides the speed of the object over multiple cycles. The same applies to the variance in the acceleration of the object or the variance in the absolute acceleration of the object, which can likewise be ascertained according to step f). The intensity of the object cumulated over the cycles is dependent on the radar signal reflected from the object. By way of example, it can be described as the height of the curve of the spectrum range or the bin in the power spectrum. Frequently, there is a relationship between the size of the object and the intensity of the object in the power spectrum. As such, large objects, such as a heavy goods vehicle, for example, produce more intense reflections than small objects, such as a pedestrian, for example. The intensity of the radar signals reflected from the object likewise governs the intensity range of the object from the power spectrum. For this, there is provision for a particular intensity range of the power spectrum, that is to say, by way of example, multiple bins or spectrum ranges from the power spectrum, to be combined for the feature of the intensity range of the object. This can make sense, because the object can extend over multiple bins or power spectrum ranges. This firstly relates to measurement accuracies, and secondly, it is possible for an object to have different relative speeds, for example, such as a pedestrian moving his arms. In addition, to a certain extent, different speeds of the object in the power spectrum are also possible. This may be attributable to multiple reflections, for example, which thereby have a longer propagation time.

In a further embodiment, an average filter that averages the intensity over the cycles is taken into consideration for the intensity of the object cumulated over the cycles. The average filter computes or averages the intensity of the object in the respective spectrum range with preceding cycles. The advantage is now that it is thus possible to take steps against the high variance in the intensity or in the reflected radar signal. As such, the strength of the reflected radar signal in an unprocessed or unpreprocessed state is too variable for a class to be able to be assigned. As such, it is the case, by way of example, that a large object that reflects the radar signals to a great extent or has a high intensity in the respective spectrum range is concealed by another large object, or is concealed intermittently. This would result in the large object having a high intensity over a few cycles and then suddenly having only a low intensity. The same goes for a small object, which can likewise be concealed at least intermittently by a large or in this case also a small object. In order to average these varying intensities, the average filter can be applied.

Additionally or alternatively, the assignment to a class is performed on the basis of the intensity of the object cumulated over the cycles with at least one linear division of a feature space of the intensity cumulated over the cycles. As such, by way of example, the feature space that represents the intensity of the object cumulated over the cycles on the basis of the distance can be divided in such a linear manner, that is to say using straight lines, that different classes are determined thereby.

In addition, the intensity range of the object from the power spectrum is taken into consideration on the basis of a rectangular detail from the power spectrum. The intensity range of the object in the power spectrum comprises multiple spectrum ranges, for example. The reflected radar signals from the object are usually distributed over multiple spectrum ranges of the power spectrum. As such, this can be explained in the distance or range axis of the power spectrum, for example, by the object, on account of multiple reflections, also reflecting radar signals that have a longer propagation time than those which have been reflected without a detour. This results in the object occupying multiple spectrum ranges in the power spectrum on the axis of the distance value. Additionally or alternatively, it may also be the case, by way of example, that the reflected radar signals from the object extend over multiple spectrum ranges in the direction of the axis of the speed value or the Doppler axis, however. This is the case with a pedestrian moving his arms, for example. In this case, an object has different speeds. In order thus to use preferably all the intensities of the power spectrum from an object, the rectangular detail can be taken into consideration. Preferably, the rectangular detail from the intensity range extends over a larger range of the distance value than over the speed value. The spectrum range is at least one matrix element from the power spectrum that is in the form of a two-dimensional matrix.

In particular, the different classes characterize different road users. This is advantageous because it allows the objects to be assigned to different road users. It is thus possible, by way of example, to establish whether the object is a human being or a vehicle. This may be particularly advantageous for the case of autonomous driving. As such, there may be a situation, for example, in which evasive action to the left or right is required. If, by way of example, there is now an unprotected human being on one side and a protected vehicle on the other side, then this can be taken as a basis for making the decision in favour of the respective side for the evasive action.

Preferably, a road user taken into consideration is a motor cycle or a car or a heavy goods vehicle or a pedestrian or a bicycle. Therefore, at least one such road user is taken into consideration on the basis of the situation. These classes are those that occur most frequently in traffic, and are therefore advantageous. If the object cannot be associated with any of the aforementioned classes, there may also be provision for the object to be associated with the "unknown" class. The advantage of this is thus that it allows a degree of uncertainty to be expressed in the classification or the assignment.

In a further embodiment, step g) is taken as a basis for taking into consideration a confidence value that describes a reliability of the comparison. The confidence value can be provided, by way of example, by a measure of similarity that is used for the comparison. The advantage of this is that a statement about the reliability of the assignment of the object to the class is possible. The confidence value thus states how certainly the assignment has been made.

In a further embodiment, the at least one feature is weighted. By way of example, it may be that the feature of the intensity of the object cumulated over the cycles is more reliable than other features. This can also mean that one of the features allows more qualitative classification or more highly qualitative assignment of the object to the particular class because the particular class is described better or more explicitly by this feature. If this is known in advance, for example, that is to say by virtue of an empirical finding, for example, then the relevant feature can be weighted accordingly.

In particular, the computation of the absolute speed of the object and of the absolute acceleration of the object is carried out on the basis of a speed of the motor vehicle and an acceleration of the motor vehicle, respectively. This means that the previously known relative speed of the object with respect to the motor vehicle can be converted into the absolute speed of the object or the absolute acceleration of the object using the known speed of the motor vehicle or the known acceleration of the motor vehicle. The absolute speed of the object or the absolute acceleration of the object is a more explicit feature than the relative speed of the object or the relative acceleration of the object and is therefore advantageous when assigning the object to the particular class.

In a further embodiment, step f) is performed on the basis of a prediction algorithm, particularly a Kalman filter. A prediction algorithm attempts to take the radar data from the preceding cycles, for example, as a basis for delivering estimates about the future radar data. The Kalman filter is a way of implementing the prediction algorithm. The Kalman filter is, in other words, a set of equations that can be used to estimate the true state of a system despite erroneous measurements and noisy system states. Alternatively, it is possible to use a particle filter, for example. The prediction algorithm allows the potential object to be tracked particularly simply and advantageously over the individual cycles and therefore allows the actual object to be identified particularly advantageously. In addition, the Kalman filter may be advantageous because it provides the features of the variance in the speed and the variance in the acceleration of the object, for example, particularly simply.

A driver assistance system according to the invention for a motor vehicle comprises at least one radar sensor for providing radar data from a surrounding area of the motor vehicle, which is designed to perform a method according to the invention.

A motor vehicle according to the invention, particularly a car, comprises a driver assistance system according to the invention.

The preferred embodiments presented with reference to the method according to the invention and the advantages of said embodiments apply accordingly to the driver assistance system according to the invention and to the motor vehicle according to the invention.

Further features of the invention are obtained from the claims, the figures and the description of the figures. The features and combinations of features cited in the description above and the features and combinations of features cited in the description of the figures below and/or in the figures alone can be used not only in the respectively indicated combination but also in other combinations or on their own without departing from the scope of the invention. Therefore, embodiments of the invention that are not shown and explained explicitly in the figures, but emerge and are producible from the explained embodiments by virtue of separate combinations of features, can also be regarded as covered and disclosed by the invention.

Exemplary embodiments of the invention are explained in more detail below with reference to schematic drawings, in which FIG. 1 shows a schematic plan view of an exemplary embodiment of a motor vehicle according to the invention with an exemplary embodiment of a driver assistance system according to the invention for classifying an object;

Figure 1:
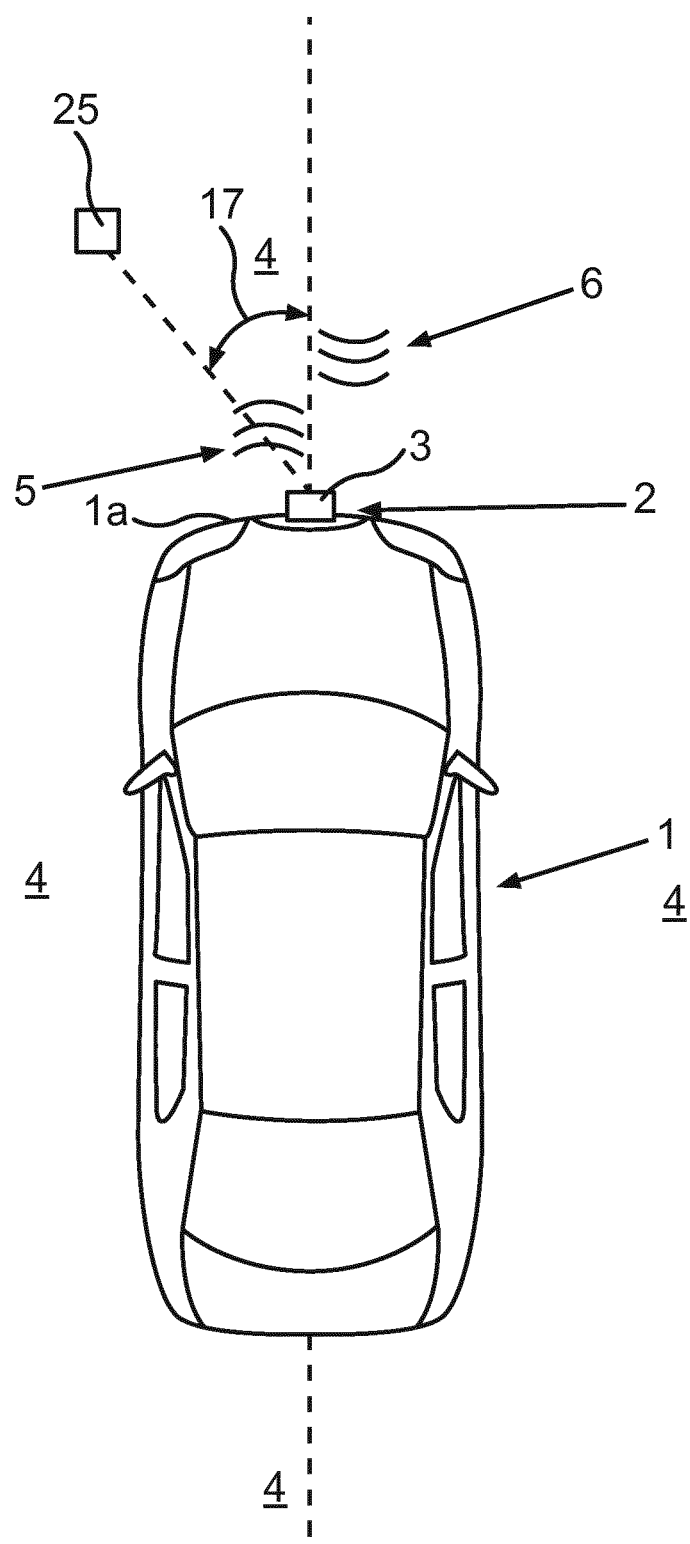

FIG. 1 schematically depicts a plan view of a motor vehicle 1 with a driver assistance system 2 according to an embodiment of the invention. In the exemplary embodiment, the driver assistance system 2 comprises a radar sensor 3. According to the exemplary embodiment in FIG. 1, the radar sensor 3 is arranged on a front 1a of the motor vehicle 1. The arrangement of the radar sensor 3 is possible in many ways, however, but preferably such that a surrounding area 4 of the motor vehicle 1 can be sensed.

The radar sensor 3 is designed to transmit radar signals into the surrounding area 4 and preferably also to receive the radar signals reflected from an object. The radar sensor 3 is preferably designed as an LFMCW radar (Linear Frequency Modulation Continuous Wave radar). This involves a chirp in the form of a ramp being modulated onto the carrier signal. The method according to the invention is alternatively able to be carried out using another FMCW radar or Frequency Modulated Continuous Wave radar.

Preferably, the LFMCW radar operates at a carrier frequency of 24 gigahertz and with a bandwidth of 200 megahertz. Modulating on the chirp requires approximately 256 microseconds and covers 200 megahertz. Alternatively, all other available carrier frequencies and bandwidths for using the method according to the invention are possible.

Figure 2:
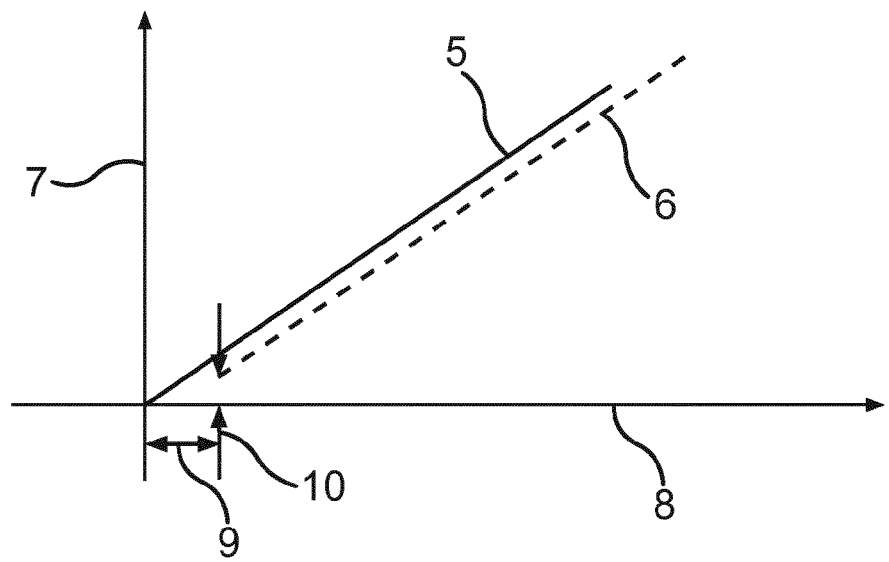
FIG. 2 shows a graph of a transmitted radar signal and of a received radar signal as a function of frequency and time.

FIG. 2 shows a transmitted radar signal 5 and a received radar signal 6. Both radar signals 5, 6 are described as a function of a frequency 7 and a time 8. In addition, a time offset 9 is indicated, which indicates a propagation time between transmission 5 and reception 6 of the radar signal, and a frequency shift 10 or a Doppler shift, which indicates a change in the frequency of the transmitted radar signal 5 on account of the reflection from a moving object, particularly an object moving in a radial direction in relation to the radar sensor 3.

Figure 3:
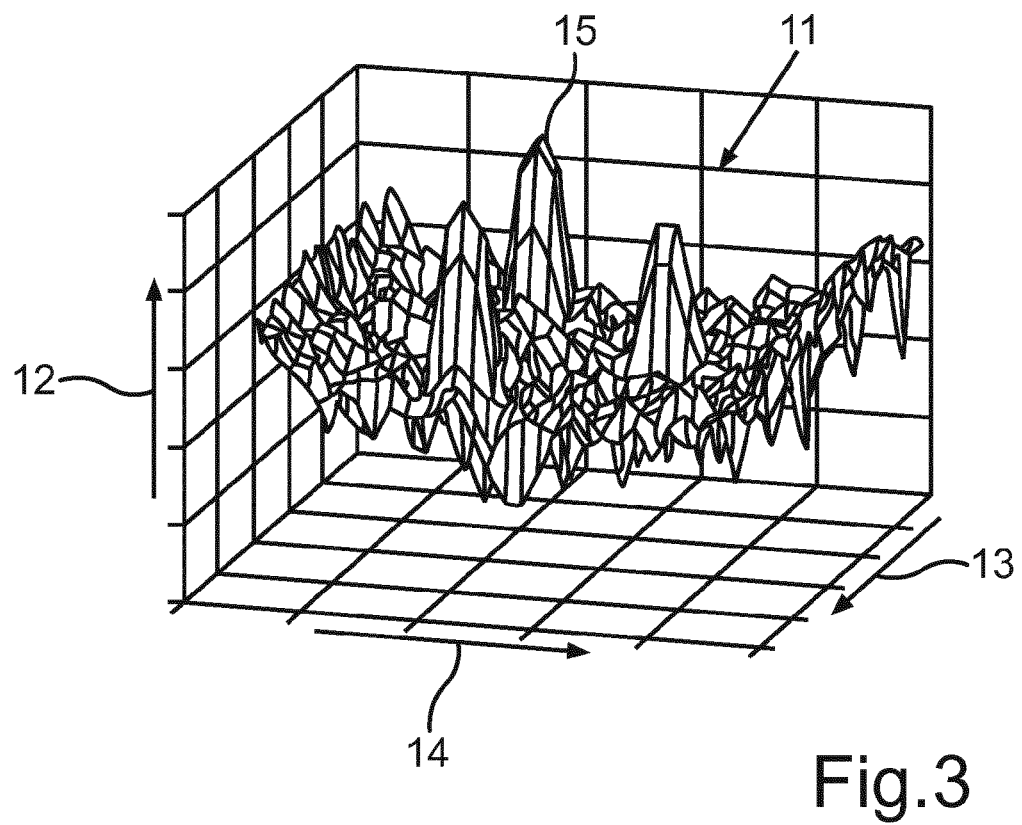
FIG. 3 shows a power spectrum, with the intensity of the received radar signal as a function of a distance value and a speed value.

FIG. 3 now shows a power spectrum 11 that can be produced by means of a fast Fourier transformation (FFT) on the basis of multiple chirps. Preferably, the power spectrum 11 is produced for each cycle, which lasts for 70 milliseconds, for example. The power spectrum 11 visualizes the intensity or the strength of the radar signal reflected by the object on the basis of a distance value 13 or a range value and a speed value 14 or a Doppler value. The power spectrum 11 is divided into spectrum ranges 15. The spectrum range 15 therefore represents an element of the matrix that describes the power spectrum 11. The spectrum range 15 is thus a discrete intensity value 12 with a distance value 13 and a speed value 14.

Figure 4:
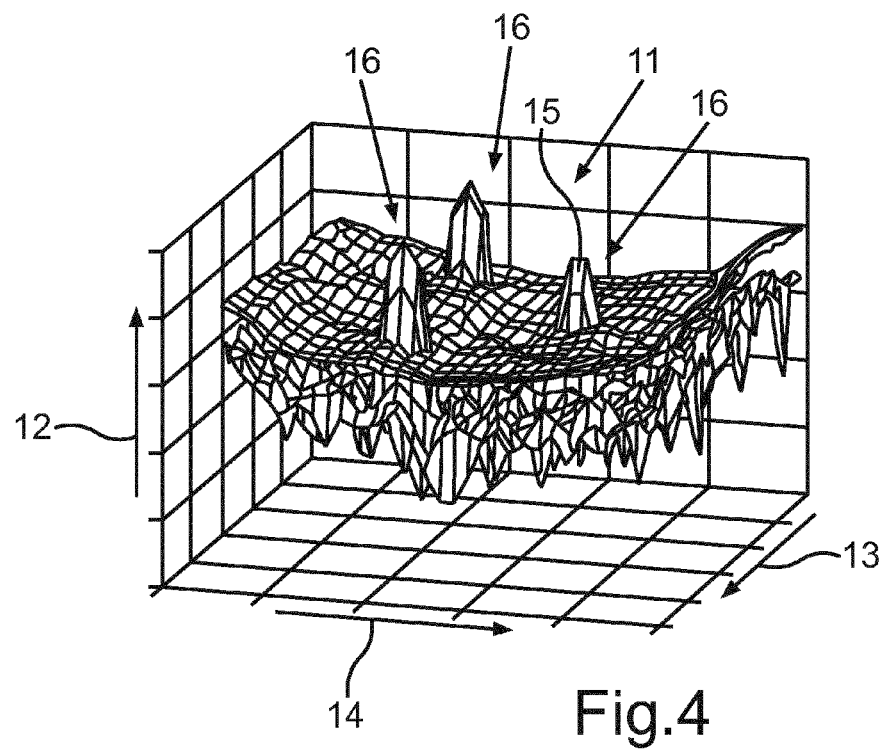
FIG. 4 shows the power spectrum analogously to FIG. 3 with intensity values greater than an intensity threshold value.

FIG. 4 shows the power spectrum 11 in which the spectrum ranges 15 have each been compared with an intensity threshold value, and the spectrum ranges 15 that have an intensity 12 greater than the intensity threshold value represent a potential object 16.

Figure 5:
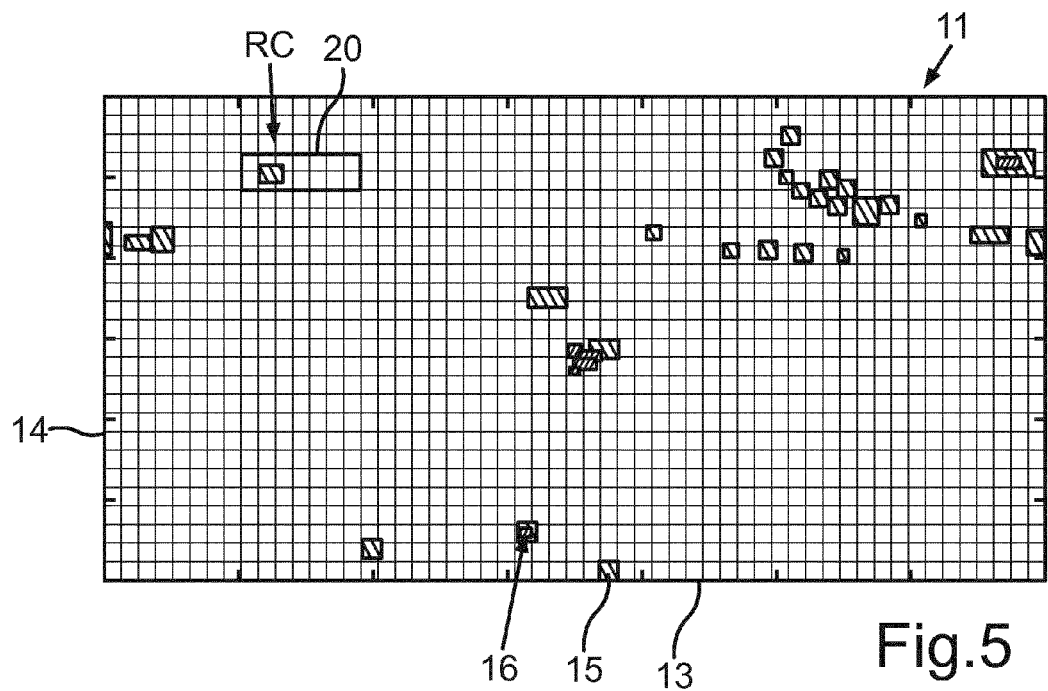
FIG. 5 shows a plan view of the power spectrum with the ordinate as speed value and the abscissa as range or distance value.

FIG. 5 shows the power spectrum 11 in a two-dimensional view or plan view. The ordinate is the speed value 14, while the abscissa is the distance value 13. Joint consideration of FIG. 3 to FIG. 5 therefore shows that a potential object 16 extends or can extend over several of the spectrum ranges 15. The reason is that the object can have different speeds or relative speeds or that the object cannot be explicitly assigned to one distance or one of the distance values 13. By way of example, the object can have different speeds if the object is a pedestrian moving his arms, for example. The fuzziness in the determination of the distance value 13 can be explained by delays in the propagation time of the radar signal, for example, which arise as a result of multiple reflections of the radar signal, for example. In addition, the resolution of the distance value 13 may be dependent on the radar sensor 3.

Figure 6:
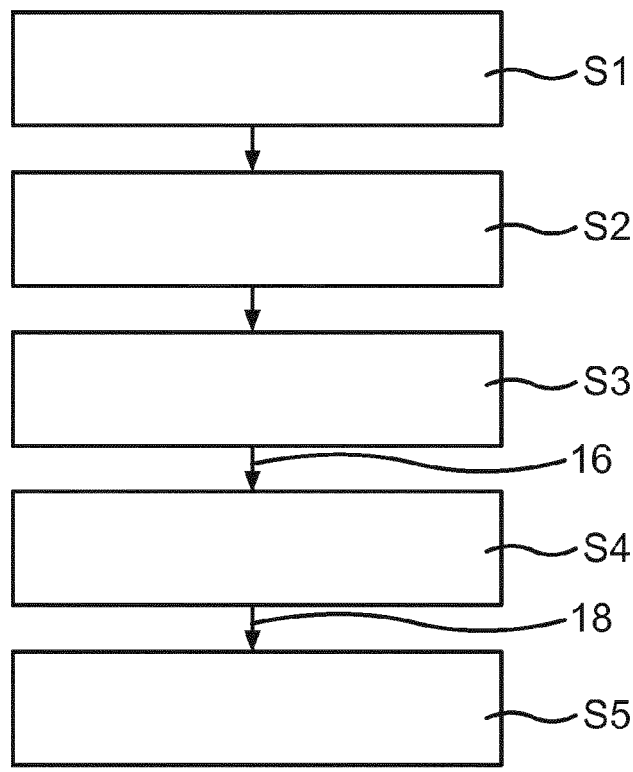
FIG. 6 shows a partial flow chart for the method according to the invention.

FIG. 6 shows a flowchart that describes the method according to the invention in specific steps. In a step S1, the chirp is modulated onto the radar signal, and the radar signal is transmitted and is received in a further step S2. In step S2, the components of the frequency shift 10 and of the time offset 9 are determined, with the power spectrum 11 being able to be provided by involving the intensity 12. The power spectrum 11 is provided for each cycle. Subsequently, in a step S3, the distance value 13, the speed value 14 and an angle of azimuth 17 are determined for each potential object 16 in the power spectrum 11. The distance value 13, the speed value 14 and the angle of azimuth 17 are the parameter values in this case. The parameter values 13, 14, 17 are used to track the potential object 16 over multiple cycles, that is to say multiple power spectra 11, in a step S4. If the potential object 16 has been trackable in step S4, then it can be assumed that it is an actual object 18. The actual object 18 is compared with reference features $V_{abs}$, $A_{abs}$, $\sigma^2 V$, $\sigma^2 A$, y, RC of a reference object in a further step S5 on the basis of features $V_{abs}$, $A_{abs}$, $\sigma^2 V$, $\sigma^2 A$, y, RC. On the basis of the comparison, the object can be assigned to a predetermined class. Finally, this information can then be taken as a basis for outputting a warning signal, for example for an RPC (Rear Pre-Crash) system. Particularly by means of step S4, the method can ensure that the classification is carried out only for the actual object 18 and not for the potential object 16.

Figure 7:
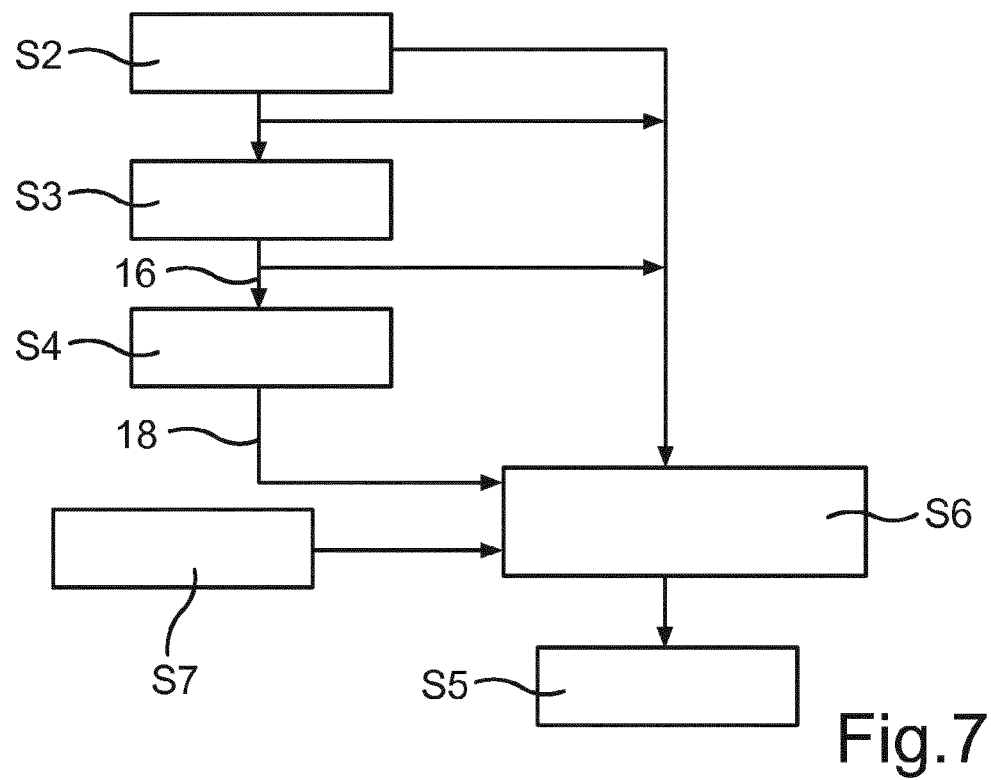
FIG. 7 shows a further flow chart for the method according to the invention.

FIG. 7 shows a further flowchart for the method according to the invention, with steps S2, S3, S4 taking place analogously to FIG. 5. A step S6 is added to illustrate the classification or the association. As previously in FIG. 5, the features $V_{abs}$, $A_{abs}$, $\sigma^2 V$, $\sigma^2 A$, y, RC of the identified object 18 are compared here with the reference features $V_{abs}$, $A_{abs}$, $\sigma^2 V$, $\sigma^2 A$, y, RC of the reference object. The features $V_{abs}$, $A_{abs}$, $\sigma^2 V$, $\sigma^2 A$, y, RC are, by way of example, an absolute speed $V_{abs}$ of the object 18, an absolute acceleration $A_{abs}$ of the object 18, a variance in the speed $\sigma^2 V$ of the object 18, a variance in the acceleration $\sigma^2 A$ of the object 18, an intensity y of the object 18 cumulated over the cycles and an intensity range RC of the object 18 from the power spectrum 11. The absolute speed $V_{abs}$ of the object 18 and the absolute acceleration $A_{abs}$ of the object 18 can be ascertained, by way of example, using the speed of the motor vehicle 1 and the acceleration of the motor vehicle 1, which are provided in step S7. The variance in the speed $\sigma^2 V$ and the variance in the acceleration $\sigma^2 A$ can be provided, by way of example, by a prediction algorithm, for example a Kalman filter, that is used for the tracking in step S4. The remaining features y, RC are subsequently described using graphics. After step S6, FIG. 7 likewise shows step S5, which outputs the warning signal after classification has taken place. The warning signal can be output to a driver of the motor vehicle, specifically visually and/or audibly and/or haptically, but it can additionally or alternatively also be output as a control signal to the motor vehicle 1.

The classification, as performed in step S6, assigns the object 18 to a particular class from multiple different classes. The different classes preferably characterize different road users. These road users may be, by way of example, a motor cycle and/or a car and/or a heavy goods vehicle and/or a pedestrian and/or a bicycle. Additionally or alternatively, an unknown object may also be provided as one of the particular classes. The unknown object can be chosen as the class in uncertain or unclear cases. In one particular embodiment, there may also be provision for road signs or bridges to be classified.

For the classification, it is possible to use the absolute speed $V_{abs}$, for example, because larger objects 18, such as heavy goods vehicles, for example, do not usually travel at high speeds. The objects 18 can thus be assigned to a class using the feature of the absolute speed $V_{abs}$, for example. The absolute speed $V_{abs}$ is computed as follows:

$$V_{abs} = V_{motor\ vehicle} - V_{object}$$

if ($V_{abs}$>limit value), it then follows that object 18≠heavy goods vehicle $V_{motor\ vehicle}$ is the speed of the motor vehicle 1 and $V_{object}$ is the speed of the object 18 relative to the motor vehicle 1.

Analogously, the absolute acceleration $A_{abs}$ can be used as a feature in order to assign the object 18 to a particular class. The absolute acceleration $A_{abs}$ is computed as follows:

$$A_{abs} = A_{motor\ vehicle} - A_{object}$$

if ($A_{abs}$>limit value), then it follows that object 18≠heavy goods vehicle

The respective limit value can be determined on the basis of training data in a training process.

For the estimation of the variance in the speed $\sigma^2 V$ and the variance in the acceleration $\sigma^2 A$, the following mathematical relationships are assumed, for example:

$$\sigma^2 V = \frac{1}{n} \sum_{i=1}^{n} (V_{abs,i} - V_{mean})^2$$

where $V_{abs}$ is the absolute speed $V_{abs}$. i denotes the respective cycle, and n denotes the maximum number of cycles. $V_{mean}$ is the arithmetic mean of all absolute speeds $V_{abs}$ over all cycles.

$$\sigma^2 A = \frac{1}{n} \sum_{i=1}^{n} (A_{abs,i} - A_{mean})^2$$

where $A_{abs}$ represents the absolute acceleration $A_{abs}$ and $A_{mean}$ represents the average acceleration over all cycles. For the variance in the speed $\sigma^2 V$ and the variance in the acceleration $\sigma^2 A$, too, there is a respective limit value.

If ($\sigma^2 V$>limit value), then it follows that object 18 heavy goods vehicle or if ($\sigma^2 A$>limit value) then it follows that object 18 heavy goods vehicle In these cases, it is thus always assumed that the object 18 is a different class from heavy goods vehicle, because the absolute speed $V_{abs}$ and/or the absolute acceleration $A_{abs}$ and/or the variance in the speed $\sigma^2 V$ and/or the variance in the acceleration $\sigma^2 A$ is above a standard value known from training data, the limit value, for heavy goods vehicles.

Figure 8:
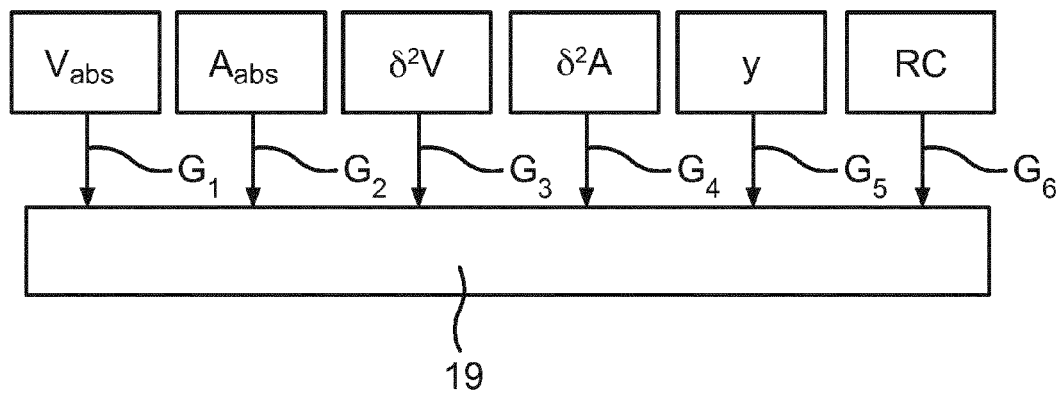
FIG. 8 shows features of the identified object with weights and a resultant feature vector.

FIG. 8 shows how the feature vector 19 is determined on the basis of the absolute speed $V_{abs}$, the absolute acceleration $A_{abs}$, the variance in the speed $\sigma^2 V$, the variance in the acceleration $\sigma^2 A$, the intensity y of the object 18 cumulated over the cycles and the intensity range RC. Each of these features $V_{abs}$, $A_{abs}$, $\sigma^2 V$, $\sigma^2 A$, y, RC can additionally be weighted using a weight $G_1$ to $G_6$.

Figure 9:
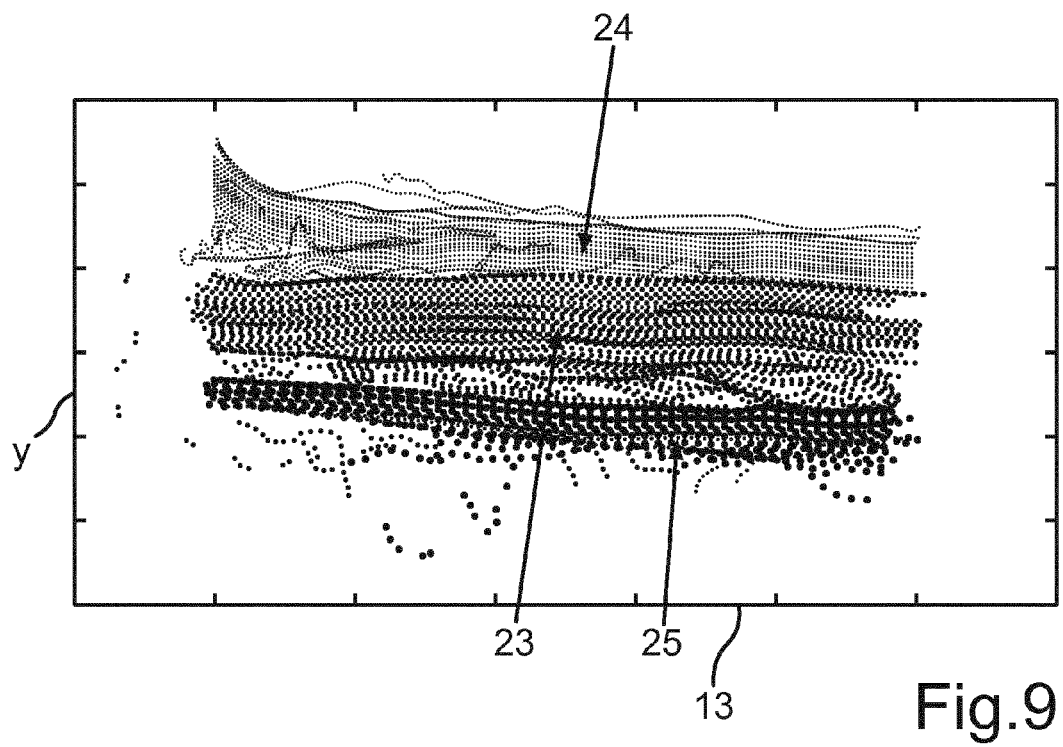
FIG. 9 shows a graph of the feature of an intensity of the object cumulated over the cycles.

FIG. 9 describes the feature of the intensity y cumulated over the cycles. The cumulated intensity, computed using the average filter, of an object 18 or of a spectrum range 15 is plotted on the ordinate, while the distance value 13 of the corresponding spectrum range 15 is plotted on the abscissa. A distinction is drawn in the present case between three classes to which the object 18 is assigned. These classes can be separated from one another linearly, for example, that is to say using straight lines. The class having the highest y value is a heavy goods vehicle in the present case, for example, the class having the lowest y value is a motor cycle, and the class between the other two classes is a car.

The intensity y cumulated over the cycles is computed as follows. Additionally, the computation includes the average filter, which takes into consideration the intensity from the previous cycles.

$$y(n)=\alpha x(n)+\beta y(n-1),$$

n is the respective cycle, and x is the intensity 12 or the strength of the radar signal reflected from the object 18. $\alpha=1/m$ and $\beta=1-1/m$. m is the number of cycles for the first cycle. For the computation of y, m is set to 1. m then increases by 1 with every further cycle.

The feature of the intensity range RC of the object 18 is produced on the basis of the power spectrum 11. To this end, a rectangular window or a rectangular intensity range is selected over the power spectrum 11. In general, the selected intensity range can have any other shape or size, however. In addition, all the spectrum ranges 15 or bins within the rectangular detail 20 that are above a predetermined intensity threshold value are now counted. The intensity threshold value may be 20 dB, for example. The feature of the intensity range RC of the object 18 is thus therefore an integer or an integer value for each object 18 in the power spectrum 11. For the power spectrum 11 of the next cycle, a new value is determined for the feature of the intensity range RC of the object 18. The feature of the intensity range RC of the object 18 can also be referred to as a range counter.

Figure 10:
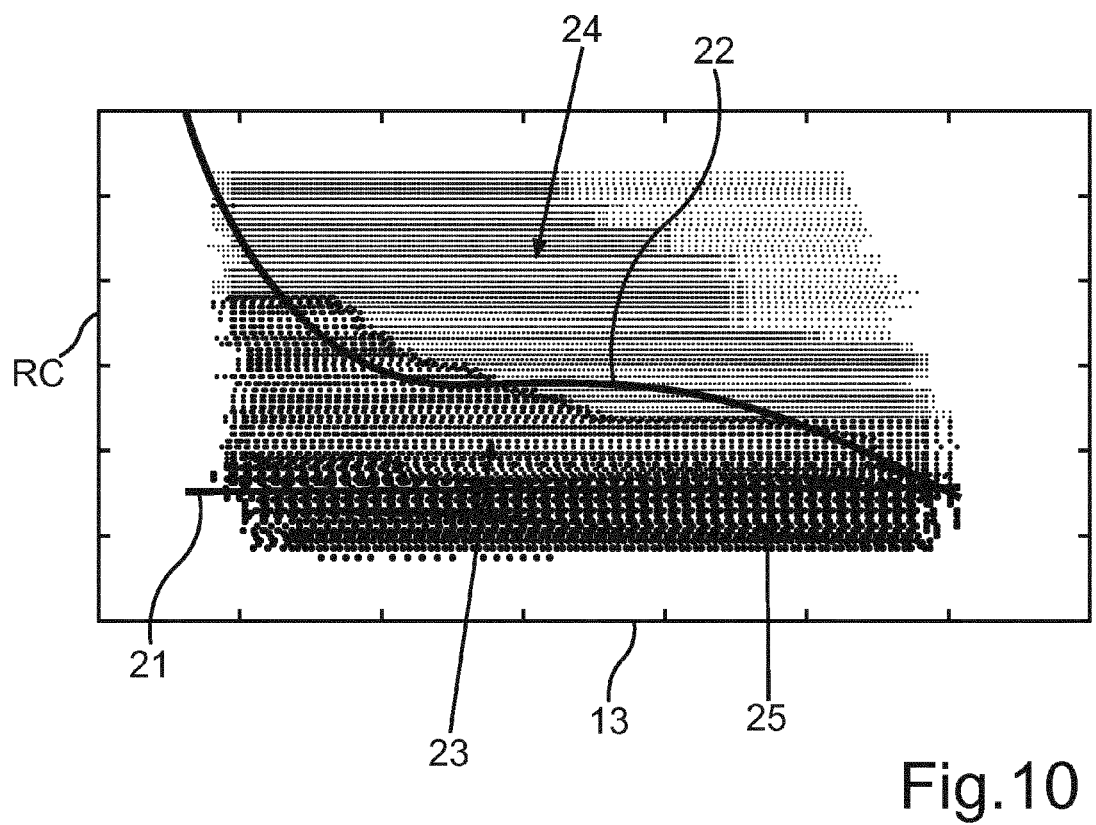
FIG. 10 shows a graph of the feature "intensity range of the object" on the basis of training data.

FIG. 10 shows a depiction of the feature of the intensity range RC of the object 18 on the basis of a plurality of reference objects. As such, it schematically shows how, by way of example, the motor cycle class 25 in the lower area of the graph, which class extends essentially from 0 to 10 on the ordinate or the value of the intensity range RC of the object 18, separates from the class above it, which describes cars in the present case. The separation between the motor cycle class 25 and the car class 23 is visualized by means of a separating line 21. In addition, the separation of the car class 23 and the heavy goods vehicle class 24 is described by means of a second separating line 22. The abscissa in FIG. 10 describes the distance value 13.

The dimensions of the rectangular detail 20 may be three of the spectrum ranges 15 and 20 of the distance values 13, for example. However, a different dimension of the rectangular detail 20 is also possible.

In addition, the feature vector 19 can be taken as a basis for providing a confidence value that allows a statement about the reliability of the classification. As such, the class can be assigned on the basis of the highest value of the respective feature $V_{abs}$, $A_{abs}$, $\sigma^2 V$, $\sigma^2 A$, y, RC in the feature vector 19, for example. If a feature $V_{abs}$, $A_{abs}$, $\sigma^2 V$, $\sigma^2 A$, y, RC of the feature vector 19 is significantly higher than the other features $V_{abs}$, $A_{abs}$, $\sigma^2 V$, $\sigma^2 A$, y, RC of the feature vector 19, for example, then a very reliable classification can be assumed, for example. On the other hand, if the results of the comparison of the features $V_{abs}$, $A_{abs}$, $\sigma^2 V$, $\sigma^2 A$, y, RC with the reference features $V_{abs}$, $A_{abs}$, $\sigma^2 V$, $\sigma^2 A$, y, RC for all the features $V_{abs}$, $A_{abs}$, $\sigma^2 V$, $\sigma^2 A$, y, RC of the feature vector 19 are situated close together, then the classification can be assumed to have low reliability, for example.

The feature vector 19 can be realised as an array, for example, with each index or each element of the feature vector 19 being intended for a particular class. The value that is stored in this index describes how often the result of the feature $V_{abs}$, $A_{abs}$, $\sigma^2 V$, $\sigma^2 A$, y, RC has described this class. This means that each time a feature $V_{abs}$, $A_{abs}$, $\sigma^2 V$, $\sigma^2 A$, y, RC has described a particular class, the counter is increased accordingly. In one particular embodiment, the counter is increased on the basis of the weight G. As such, a result that is described by the feature vector 19 may have the following appearance, for example.

$$\text{Vector} = \begin{bmatrix} 4 \\ 0 \\ 0 \\ 0 \end{bmatrix} \begin{array}{l} \text{Heavy goods vehicle} \\ \text{Car} \\ \text{Motor cycle} \\ \text{Pedestrian} \end{array}$$

In the present case, there has thus been a vote for heavy goods vehicle, that is to say heavy goods vehicle class 24, four times. In a further embodiment, a minimum number of cycles may be required, for example, in order to obtain a reliable assignment to a class. As such, it can be assumed, by way of example, that at least five cycles are necessary in order to be able to make a reliable statement about the assignment to the particular class. As such, a further feature vector 19 may have the following appearance, for example.

$$\text{Vector} = \begin{bmatrix} 7 \\ 2 \\ 1 \\ 0 \end{bmatrix} \begin{array}{l} \text{Heavy goods vehicle} \\ \text{Car} \\ \text{Motor cycle} \\ \text{Pedestrian} \end{array}$$

In this case, there are more than five cycles available, and the result can be assumed to be reliable. By way of example, it can be assumed here that the probability of a heavy goods vehicle or the heavy goods vehicle class 24 is 70 percent, while the probability of the car class 23 is 20 percent and the motor cycle class 25 has only a 10 percent possibility.

The invention claimed is:

1. A method for classifying an object in a surrounding area of a motor vehicle, the method comprising:
    a) transmission of radar signals into the surrounding area by at least one motor vehicle radar sensor and reception of radar signals reflected from the object;
    b) provision of the information obtained from the radar signals as radar data;

c) production of a power spectrum on the basis of at least one distance value and/or speed value and/or intensity value that the radar data contain as information;
d) comparison of at least one spectrum range that the power spectrum contains with an intensity threshold value and selection of the spectrum range as a potential object when the intensity thereof is greater than the intensity threshold value;
e) performance of a further cycle with steps a) to d);
f) identification of the potential object as an actual object on the basis of whether the potential object has been selected both in a first cycle according to steps a) to d) and at least in the second cycle according to step e);
g) comparison of at least one feature of the identified object with reference features of a reference object; and
h) assignment of the object to a class from multiple different classes on the basis of the comparison according to step g),
wherein the at least one feature is an intensity range of the object from the power spectrum,
wherein the intensity range of the object comprises multiple spectrum ranges, and
wherein the intensity range of the object is taken into consideration on the basis of a rectangular detail from the power spectrum.

2. The method according to claim 1, further comprising
in the first cycle, after selection of the potential object, determination of at least one parameter value characterizing the spectrum range; and
in the second cycle, after selection of the potential object, determination of the at least one parameter value characterizing the spectrum range is performed and the identification of the potential object as an actual object according to step f) is effected on the basis of whether the parameter values have occurred in both cycles at least within a deviation interval defining a value range of the parameter values.

3. The method according to claim 2, wherein the parameter value taken into consideration is a distance value from the radar sensor to the object and/or a relative speed between the radar sensor and the object and/or an angle of azimuth from the radar sensor to the object.

4. The method according to claim 1, wherein the at least one feature taken into consideration further comprises one selected from the group consisting of: an absolute speed of the object, an absolute acceleration of the object, a variance in the speed of the object, a variance in the acceleration of the object, and an intensity of the object cumulated over the cycles.

5. The method according to claim 4, wherein the computation of the absolute speed of the object and of the absolute acceleration of the object is carried out on the basis of a speed of the motor vehicle and an acceleration of the motor vehicle, respectively.

6. The method according to claim 4, wherein an average filter that averages the intensity over the cycles is taken into consideration for the intensity of the object cumulated over the cycles.

7. The method according to claim 6, wherein the assignment to a class is performed on the basis of the intensity of the object cumulated over the cycles with at least one linear division of a feature space of the intensity cumulated over the cycles.

8. The method according to claim 1, wherein the different classes characterize different road users.

9. The method according to claim 8, wherein a road user taken into consideration is one selected from the group consisting of: a motor cycle, a car, a heavy goods vehicle, a pedestrian, and a bicycle.

10. The method according to claim 1, wherein step g) is taken as a basis for taking into consideration a confidence value that describes a reliability of the comparison.

11. The method according to claim 1, characterized in that the at least one feature is weighted.

12. The method according to claim 1, characterized in that step f) is performed using a prediction algorithm, particularly a Kalman filter.

13. A driver assistance system having at least one radar sensor for providing radar data from a surrounding area of a motor vehicle configured to perform a method according to claim 1.

14. A motor vehicle having a driver assistance system according to claim 13.

* * * * *